United States Patent
Lima Ramirez

(10) Patent No.: US 9,505,408 B2
(45) Date of Patent: Nov. 29, 2016

(54) METHOD FOR ADJUSTING THE STARTING TORQUE IN A VEHICLE

(75) Inventor: Victor Jose Lima Ramirez, Stuttgart (DE)

(73) Assignee: Robert Bosch GmbH, Stuttgart (DE)

(*) Notice: Subject to any disclaimer, the term of this patent is extended or adjusted under 35 U.S.C. 154(b) by 0 days.

(21) Appl. No.: 14/115,496

(22) PCT Filed: Apr. 12, 2012

(86) PCT No.: PCT/EP2012/056620
§ 371 (c)(1),
(2), (4) Date: Jan. 29, 2014

(87) PCT Pub. No.: WO2012/150111
PCT Pub. Date: Nov. 8, 2012

(65) Prior Publication Data
US 2014/0136072 A1    May 15, 2014

(30) Foreign Application Priority Data

May 3, 2011 (DE) .......... 10 2011 075 111
Oct. 18, 2011 (DE) .......... 10 2011 084 695

(51) Int. Cl.
| | |
|---|---|
| B60T 7/12 | (2006.01) |
| B60W 30/18 | (2012.01) |
| B60W 10/04 | (2006.01) |
| B60W 10/06 | (2006.01) |
| B60W 10/184 | (2012.01) |

(52) U.S. Cl.
CPC .......... *B60W 30/18* (2013.01); *B60W 10/04* (2013.01); *B60W 10/06* (2013.01); *B60W 10/184* (2013.01); *B60W 30/18027* (2013.01); *B60W 30/18118* (2013.01); *B60W 30/18172* (2013.01); *B60W 2520/10* (2013.01); *B60W 2540/10* (2013.01); *B60W 2550/142* (2013.01); *B60W 2710/0666* (2013.01); *B60W 2710/0672* (2013.01)

(58) Field of Classification Search
None
See application file for complete search history.

(56) References Cited

U.S. PATENT DOCUMENTS

| | | | |
|---|---|---|---|
| 2001/0029422 A1 | 10/2001 | Schmitt | |
| 2007/0199745 A1* | 8/2007 | Hayashi | 180/65.2 |
| 2009/0063000 A1 | 3/2009 | Kodama et al. | |
| 2010/0070138 A1* | 3/2010 | Schoening et al. | 701/42 |
| 2011/0005212 A1* | 1/2011 | Matsushita et al. | 60/299 |
| 2012/0010792 A1* | 1/2012 | Nedorezov et al. | 701/54 |

FOREIGN PATENT DOCUMENTS

| | | |
|---|---|---|
| CN | 101767587 A1 | 7/2010 |
| CN | 101959736 A1 | 1/2011 |
| DE | 10017245 | 10/2001 |
| DE | 102008039779 | 4/2009 |
| DE | 102009018854 | 11/2009 |
| EP | 2082938 | 7/2009 |

OTHER PUBLICATIONS

International Search Report for PCT/EP2012/056620, issued on Sep. 25, 2012.

\* cited by examiner

*Primary Examiner* — Adam Alharbi
(74) *Attorney, Agent, or Firm* — Norton Rose Fulbright US LLP; Gerard Messina

(57) ABSTRACT

In a method for adjusting the drive-off torque while driving off in a vehicle, the rise ($\delta M_{dr}$) of the effectively acting actual drive torque ($M_{ist}$) is limited to a maximum rise ($\delta M_{max}$).

17 Claims, 1 Drawing Sheet

METHOD FOR ADJUSTING THE STARTING TORQUE IN A VEHICLE

FIELD OF THE INVENTION

The invention refers to a method for adjusting the drive-off torque while driving off in a vehicle.

BACKGROUND INFORMATION

Drive slip regulating systems (automatic slip control, ASR), which limit drive torque by way of an intervention in the engine management system of an engine of a vehicle in order to keep the vehicle stable, are known. The limitation of drive torque occurs in slip-dependent fashion, the drive torque being more greatly decreased in the case of low coefficients of friction, for example on snow.

A prerequisite for engagement of the drive slip regulation system is that the speed of the driven wheels must exceed a target speed. Problems can occur with automatic slip control when driving off from a stop, since (as defined by the concept) the target slip at a stop approaches infinity. In practice, the target slip is set so that the engine is not stalled by the automatic slip control system. The driven wheels can, however, thereby end up in an unstable region of the friction/slip curve, with the result that driving off on an uphill slope on snow or ice becomes more difficult and in some circumstances in fact impossible.

SUMMARY

An object on which the invention is based is that of carrying out drive-off operations in vehicles in stable fashion even in a context of low coefficients of friction.

The method according to the present invention is used to adjust the drive-off torque when driving off in a vehicle from a stop. The method makes it possible to accelerate the vehicle from a stop and to keep the vehicle stable even in a context of low coefficients of friction, for example on a snow- or ice-covered road. This is achieved by limiting the rise or gradient of the effectively acting actual drive torque that is generated in the drive engine of the motor vehicle, as a rule an internal combustion engine, but optionally additionally or alternatively an electric motor as well. The limitation is accomplished by the fact that the rise is limited to a maximum rise. The drive torque stipulated by the driver is thus implemented in unlimited fashion only if the rise in the actual drive torque does not exceed the maximum rise; otherwise the limitation occurs. If the rise in the actual torque curve is below the maximum rise, however, no limitation occurs and the driver input is implemented as desired.

This procedure has the advantage that the vehicle moves in safe and stable fashion during the driving-off operation even in a context of low coefficients of friction that exist, for example, with snow and ice as a result of weather. Acceleration from a stop can be carried out with no limitation in driving safety. It is not necessary for the driver to intervene in terms of controlling the driving-off operation (by actuating the accelerator pedal with restraint) in order to keep the driving-off operation stable. The driving-off operation is instead carried out in stable fashion even if a substantial driver demand exists, which without limitation of the actual engine torque rise would result in the adhesive friction being exceeded and thus cause instability, but with the method according to the present invention is carried out within the adhesion friction range.

The method is usefully carried out in a closed- or open-loop control unit that can be a constituent of a driver assistance system, in particular of an electronic stability program (ESP system). The automatic slip control system (ASR) can be retained without modification, since the gradient or rise in the actual engine torque curve is limited by the ESP system to the maximum rise.

The maximum rise that is predefined as a limit value for the gradient or rise of the actual drive torque can optionally depend on the current state variables or parameters of the vehicle and/or of the surroundings of the vehicle. A correlation with the incline of the road on which the vehicle is standing, and is to be accelerated from a stop, is particularly appropriate. The maximum rise as limit value is decreased with increasing road incline in order to prevent the wheels from slipping beyond a permissible extent when driving off uphill. Conversely, the maximum rise can be raised if the road has only a slight incline. The maximum rise assumes a maximum possible value for a flat road.

Additionally or alternatively, further correlations of the maximum rise are possible, for example a correlation with ambient temperature, by the fact that, for example, at temperatures below freezing the maximum rise is set to a lower value than at temperatures above freezing. A possible snow or ice situation can thereby be taken into account.

A manual intervention to define the magnitude of the maximum rise is also possible. For example, a summer program or winter program can be set by the driver in the vehicle, with the result that corresponding characteristic curves are activated and the maximum rise is set to a higher or lower value. The desired driving behavior can also be adjusted, if applicable in this manner, for example by distinguishing between "sport" behavior and "comfort" behavior for the vehicle. Such settings are either stipulated manually by the driver, set at the factory as the driver desires, or determined from driver reactions while the vehicle is in operation.

According to a further useful embodiment, provision is made that only the rise of the drive torque is limited, but not the maximum value, which is stipulated by the driver. In the context of an effective limiting of the rise, the maximum value corresponding to the driver input is thus reached only at a later point in time because of the flatter curve rise. The absolute magnitude of the engine torque is not thereby influenced, however.

According an alternative embodiment, it is also conceivable for the absolute magnitude of the engine torque also to be limited to a maximum value, in particular in situation-dependent fashion, for example as a function of road incline.

In accordance with a further useful embodiment, the duration of the limitation of the maximum rise can be limited. One possibility is a time-related limitation, by the fact that the limitation of the effective rise to the maximum rise occurs only for a limited time period, such that after the time period has elapsed either the limitation is entirely cancelled, so that from then on the rise coincides with the rise derived from the driver input, or the maximum value is modified, in particular decreased.

It is also possible, when a speed threshold is reached, to cancel the limitation to the maximum rise or to define a new value for the maximum rise. In any case, i.e. in the context of both time limitation and limitation until a speed threshold is reached, the corresponding threshold values (time period or speed threshold) either can be specified as constants or can depend on state variables or situation variables, for example on road incline.

According to a further advantageous embodiment, the limitation of the actual drive torque to the maximum rise does not occur until a drive torque necessary for holding the vehicle on an uphill slope has been reached. This ensures that when driving off on an uphill slope, the drive torque necessary in order to hold the vehicle is generated in the shortest possible time. Only then does the limitation of the rise to the maximum rise occur. Until that point in time, however, a higher rise is also possible if it is stipulated by the driver.

According to a further advantageous embodiment, when driving off on an uphill slope the actual drive torque is elevated in the same manner that the brake torque currently acting in the vehicle is decreased. What results therefrom in total is a torque balance equal to zero. This ensures that in the first moments of driving off, when the drive torque is first being built up, the vehicle located on an uphill slope does not unintentionally begin to move. The function can, in particular, be combined with a so-called "hill holder" function, in which the vehicle is held on an uphill slope by automatically generated active brake pressure without brake pedal actuation on the part of the driver.

The variables necessary for carrying out the method, such as e.g. the uphill slope, are ascertained in particular using sensors, for example with the aid of acceleration sensors.

DETAILED DESCRIPTION

Figure 1:
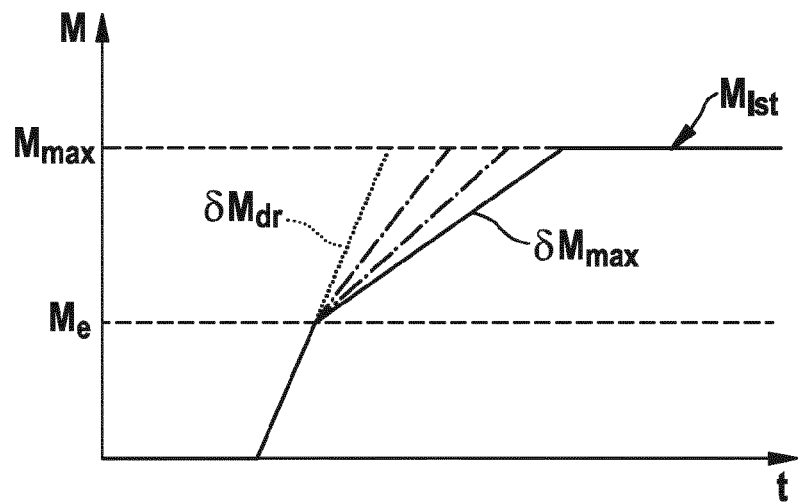
FIG. 1 is a diagram showing the curve for drive torque as a function of time.

FIG. 1 is a diagram of drive torque versus time showing the curve for the effectively acting actual drive torque in a vehicle that is generated by the drive motor of the vehicle when driving away from a stop. The curve $M_{ist}$ rises from zero to a maximum value $M_{max}$ that corresponds to the driver's input. Until a first drive level $M_e$, located below the maximum value $M_{max}$, is reached, the driver stipulation is implemented without restriction. The first drive torque level $M_e$ corresponds to that drive torque which is necessary in order to hold the vehicle on the uphill slope on which the vehicle is presently located. The drive torque $M_e$ is uphill slope-dependent; the magnitude of the uphill slope on which the vehicle is parked can be ascertained, for example, by way of an acceleration sensor.

When the drive torque $M_e$ that is necessary for holding the vehicle is exceeded, the rise $\delta M_{dr}$, which reflects the driver input, begins to be limited under specific conditions to a maximum rise $\delta M_{max}$. This limitation of the rise or gradient is intended to ensure the stability of the vehicle even in a context of low coefficients of friction. The limitation to the maximum rise occurs only if the driver's stipulation exceeds the maximum rise. The magnitude of the maximum rise $\delta M_{max}$ can depend on a variety of state variables or situation variables, in particular on the uphill slope on which the vehicle is parked. As the uphill slope increases, the gradient $\delta M_{max}$ becomes smaller. Further correlations are additionally appropriate, however, for example ambient temperature; the maximum rise $\delta M_{max}$ can likewise be decreased in the case of temperatures below freezing.

The maximum level $M_{max}$ of the engine torque is not limited, however, so that the rise in engine torque occurs until the maximum torque $M_{max}$ desired by the driver is reached.

Figure 2:
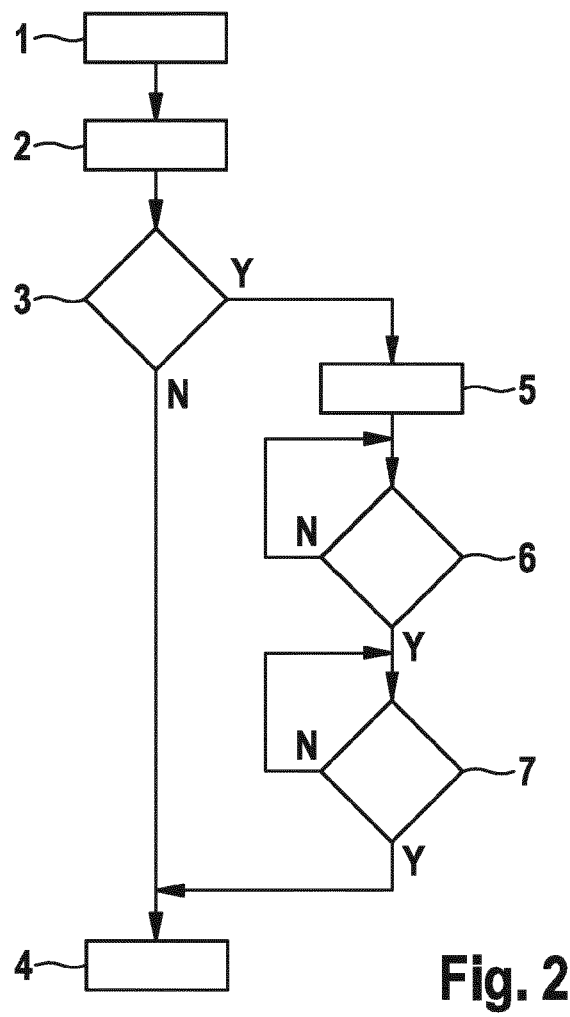
FIG. 2 is a flow chart with method steps for carrying out the method for limiting the rise of the actual drive torque to a maximum rise.

FIG. 2 is a flow chart showing individual method steps for limiting the maximum rise of the engine torque curve. In the first method step 1, firstly the uphill slope of the road surface on which the vehicle is parked is determined In the next method step 2 the driver input, stipulated by the driver by actuating the accelerator pedal, is identified. Here the rise $\delta M_{dr}$ of the drive torque desired by the driver is ascertained, and is checked in method 3 for exceedance of the maximum rise $\delta M_{max}$, which represents the associated threshold value that was calculated as a function of the uphill slope in the preceding method step 1. If the query in method step 3 indicates that the rise of the engine drive torque as desired by the driver is below the maximum permissible rise $\delta M_{max}$, execution continues along the No branch ("N") to method step 4, and the engine drive torque is implemented without restriction in accordance with the driver stipulation.

If the query in method step 3 indicates, however, that the rise $\delta M_{dr}$ of the engine torque as desired by the driver exceeds the associated maximum rise $\delta M_{max}$, execution continues along the Yes branch ("Y") to method step 5, in which the rise of the effectively acting actual drive torque is limited to the maximum rise $\delta M_{max}$.

Subsequently to method step 5, execution continues to method step 6, according to which the limitation to the maximum rise is limited to a defined time period. In method step 6 a query occurs as to whether that time period has already elapsed. If that is not yet the case, execution proceeds along the No branch back to the beginning of method step 6, and the query is executed again at cyclical intervals. Once the time period has ended, execution continues along the Yes branch to the next method step 7. The time period can likewise depend on state variables or situation variables, in particular on the uphill slope.

In method step 7, the time limitation to the maximum rise follows the attainment of a defined speed threshold. If this speed threshold has not yet been attained, execution proceeds along the No branch back to the beginning of method step 7, and step 7 is executed again at cyclical intervals. Once the speed threshold has been attained, execution continues along the Yes branch to the next method step 4, which marks the end of the method; from then on the engine drive torque is implemented without limitation and as desired by the driver. The speed threshold on which the query in step 7 is based can again depend on state variables or situation variables, in particular on the road incline.

What is claimed is:

1. An automated method for adjusting a drive-off torque while driving off in a vehicle from a stopped state, comprising:
limiting, by an electronic stability control system of the vehicle, a rate of rise of an effectively acting actual drive torque in the vehicle to a maximum rate of rise, wherein the maximum rate of rise of the actual drive torque depends on a road incline, the maximum rate of rise being decreased with an increasing of the road incline;
wherein a torque curve rises from zero to a maximum value that corresponds to an input by a driver input,
wherein until a first drive level, located below the maximum value, is reached, the driver input is implemented without restriction, and wherein the first drive torque level corresponds to a drive torque which is necessary to hold the vehicle on the road incline on which the vehicle is located.

2. The method as recited in claim 1, further comprising: cancelling, by the electronic stability control system of the vehicle, the limiting to the maximum rate of rise when a speed threshold is reached.

3. The method as recited in claim 1, wherein the limiting of the rate of rise to the maximum rate of rise is limited in time.

4. The method as recited in claim 3, wherein the limiting to the maximum rate of rise is cancelled after a time period has elapsed.

5. The method as recited in claim 1, further comprising: setting, by an automatic slip control system, a maximum value of the actual drive torque to a maximum value stipulated by a driver.

6. The method as recited in claim 1, wherein the limiting of the rate of rise of the actual drive torque to the maximum rate of rise occurs only when a drive torque necessary for holding the vehicle on an uphill slope has been reached.

7. The method as recited in claim 1, further comprising: when driving off on an uphill slope, elevating the actual drive torque in the same manner that a brake torque in the vehicle is decreased.

8. A closed- or open-loop control unit for automatically adjusting a drive-off torque while driving off in a vehicle from a stopped state, comprising:
an electronic stability control system for limiting a rate of rise of an effectively acting actual drive torque in the vehicle to a maximum rate of rise, wherein the maximum rate of rise of the actual drive torque depends on a road incline, the maximum rate of rise being decreased with an increasing of the road incline;
wherein a torque curve rises from zero to a maximum value that corresponds to an input by a driver input,
wherein until a first drive level, located below the maximum value, is reached, the driver input is implemented without restriction, and
wherein the first drive torque level corresponds to a drive torque which is necessary to hold the vehicle on the road incline on which the vehicle is located.

9. A driver assistance system, comprising:
a closed- or open-loop control unit for automatically adjusting a drive-off torque while driving off in a vehicle from a stopped state, including:
an electronic stability control system for limiting a rate of rise of an effectively acting actual drive torque in the vehicle to a maximum rate of rise, wherein the maximum rate of rise of the actual drive torque depends on a road incline, the maximum rate of rise being decreased with an increasing of the road incline;
wherein a torque curve rises from zero to a maximum value that corresponds to an input by a driver input,
wherein until a first drive level, located below the maximum value, is reached, the driver input is implemented without restriction, and
wherein the first drive torque level corresponds to a drive torque which is necessary to hold the vehicle on the road incline on which the vehicle is located.

10. The driver assistance system as recited in claim 9, wherein the driver assistance system is an ESP system in the vehicle.

11. The method as recited in claim 1, wherein the drive torque is uphill slope-dependent; the magnitude of the uphill slope on which the vehicle is parked is ascertainable by a sensor.

12. The method as recited in claim 11, wherein when the drive torque that is necessary for holding the vehicle is exceeded, the rise, which reflects the driver input, begins to be limited under specific conditions to a maximum rise.

13. The method as recited in claim 12, wherein the limitation of the rise or gradient is intended to ensure a stability of the vehicle for low coefficients of friction.

14. The method as recited in claim 13, wherein the limitation to the maximum rise occurs only if the driver input exceeds the maximum rise.

15. The method as recited in claim 14, wherein a magnitude of the maximum rise depends on the uphill slope on which the vehicle is parked.

16. The method as recited in claim 15, wherein as the uphill slope increases, the gradient becomes smaller.

17. The method as recited in claim 16, wherein a maximum level of the engine torque is not limited, so that the rise in engine torque occurs until the maximum torque desired by the driver is reached.

* * * * *